2,884,432
Patented Apr. 28, 1959

2,884,432
METHOD OF PREPARING CYCLIC SILOXANES

Arthur F. Gordon, Midland, Mich., assignor to Dow Corning Corporation, Midland, Mich., a corporation of Michigan No Drawing. Application February 9, 1956
Serial No. 564,370

3 Claims. (Cl. 260—448.2)

This invention relates to a method of preparing cyclic siloxanes by cracking polymeric siloxanes in the presence of an alkaline catalyst.

It is known from U.S. Patents 2,438,478 and 2,455,999 that cyclic organosiloxanes can be prepared by heating polymeric mixtures of mono- and diorganosiloxanes in the presence of an alkali metal hydroxide. Such treatment causes depolymerization of the polymeric siloxane with the formation of diorganosiloxane cyclics. At the same time the monoorganosiloxane remains behind in the cracking unit so that this method also affords a means of separating monoorganosiloxanes from diorganosiloxanes. The method of these patents has been used extensively commercially because in the commercial production of organosilicon chlorides it is generally quite difficult to separate by means of distillation all of the monoorganosilicon chlorides from the diorganosilicon chlorides. Every known commercial method of preparing organosilicon chlorides always gives both monoorganochlorides and diorganochlorides. Consequently the distilled materials are usually contaminated with monoorganosilicon chlorides which means that the siloxanes prepared therefrom contain monorganosiloxane units.

The method of the above patents works particularly well in the preparation of thermally stable cyclics such as dimethylsiloxane cyclics or phenylmethylsiloxane cyclics. However, it is not particularly effective for the production of cyclics which are less thermally stable than the aforesaid. For example, methylvinylsiloxanes are produced in relatively poor yields by this known method. This is true because the presence of the monoorganosiloxane causes gels to form in the cracking unit. In order to crack such gels it is necessary to employ a higher temperature in order to obtain the sufficient heat transfer throughout the mass to produce the cracking. This higher temperature causes greater disintegration of the vinyl radical and hence the production of more monoorganosiloxane. The method of this invention avoids this difficulty.

The method of the aforesaid U.S. patents does not lend itself to production of organosiloxane cyclics having two different siloxane units in the molecule. Said cyclics are hereinafter referred to as "mixed cyclics." For example, the method of the aforesaid patents is not a good way of producing monophenylheptamethylcyclotetrasiloxane or divinylhexamethylcyclotetrasiloxane. The method of the instant invention produces such mixed cyclics in good yields.

It is the object of the present invention to provide an improved method for the preparation of cyclic diorganosiloxanes. Another object is to provide a good method for the production of mixed cyclic diorganosiloxanes. Other objects and advantages will be apparent from the following description.

In accordance with this invention a fluid siloxane copolymer composed of siloxane units of the formula $PhR_2SiO_{.5}$ and $R'_2SiO$ which may contain a minor amount of $R'SiO_{1.5}$ and $SiO_2$ units, in which siloxane units R is selected from the group consisting of phenyl and methyl radicals and R' is a monovalent hydrocarbon radical of less than 8 carbon atoms, is heated in the presence of a small amount of an alkaline catalyst of the group alkali metal hydroxides, quaternary ammonium hydroxides and organosilanol salts of such hydroxides at a temperature of at least 80° C. under conditions of pressure which will allow volatiles to escape from the reaction zone.

The principle of the present invention resides in the cracking of a fluid material which remains in the fluid condition throughout the cracking operation because of the presence of relatively non-volatile triorganosiloxane units. These triorganosiloxane units can be either phenyldimethylsiloxane, diphenylmethylsiloxane or triphenylsiloxane units. These units should be employed in such proportion that the residue in the reaction zone will remain fluid throughout the cracking. Thus the amount of triorganosiloxane unit will vary depending on the amount of monoorganosiloxane and/or $SiO_2$ units in the copolymer and the minimum amount of triorganosiloxane should be at least equal to the combined amounts of monoorganosiloxane and/or $SiO_2$ units in the copolymer.

The presence of the triorganosiloxane unit is needed with unstable siloxanes even though no monoorganosiloxanes are originally present in the copolymer. This is true because the thermal instability of the higher alkyl or alkenyl units on silicon results in the production of small amounts (i.e. .01 mol percent or less) of monoorganosiloxane during the cracking. Thus the cracking of pure vinylmethylsiloxane may result in the gelation of the residue due to the formation of monomethylsiloxane by thermal degradation of the vinyl group. This gelation is prevented by the presence of the triorganosilyl units of this invention.

The upper limit of the amount of triorganosiloxane is not critical. Obviously, however, there is no advantage in employing more triorganosiloxane than is needed to keep the residue fluid. Preferably the amount of triorganosiloxane should range from .0001 mol percent to 50 mol percent of the copolymer to be cracked.

The method of this invention can be employed with any diorganosiloxane wherein the organic radicals are monovalent hydrocarbon radicals of less than 8 carbon atoms. Thus the R' groups on the silicon can be alkyl radicals such as methyl, ethyl, propyl, butyl and hexyl; alkenyl radicals such as vinyl, allyl and hexenyl; aralkyl radicals such as benzyl; aryl radicals such as phenyl and tolyl and cycloaliphatic radicals such as cyclopentyl, cyclohexyl and cyclohexenyl.

The copolymers employed in the method of this invention can be prepared by any of the known methods. Thus, for example, a crude diorganosiloxane obtained from a commercial hydrolysis of crude diorganochlorosilanes can be interacted with a triorganosiloxane in the presence of an alkali metal hydroxide or an acid in order to produce a copolymer containing the triorganosiloxane units. Alternatively the copolymers can be prepared by the cohydrolysis of the diorganodichlorosilane which may contain monoorganotrichlorosilanes and/or silicon tetrachloride, with the triorganochlorosilane.

The cracking operation of this invention is carried out by heating the fluid copolymer with one of the alkaline catalysts above defined. The temperature employed should be at least 80° C. but can be adjusted to suit the type of organosiloxane being prepared. For example, with thermally unstable groups such as allyl, lower temperatures are needed. With the more thermally stable groups such as methyl or phenyl, higher temperatures can be employed. Thus ideally the temperature employed should be sufficient to remove the desired product from the reaction mixture without being sufficient to cause appreciable degradation of the organic groups on the silicon.

With thermally unstable groups, cracking is preferably carried out at reduced pressure in order to reduce the temperature needed for the operation.

After the cracking operation has been completed, the products obtained can be separated by distillation.

The catalysts employed in this invention can be any alkali metal hydroxide such as lithium, sodium, potassium or cesium hydroxides or any quaternary ammonium hydroxide such as tetramethyl ammonium hydroxide, tetraethyl ammonium hydroxide, phenyltrimethyl ammonium hydroxide or beta-hydroxyethylbenzyldibutyl ammonium hydroxide. In addition the catalysts can be any silanol salt of the above hydroxides. These salts are of the formula

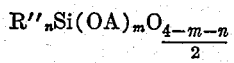

in which $R''$ is any monovalent hydrocarbon radical, A is an alkali metal ion or a quaternary ammonium ion, $m$ and $n$ both have values from 1 to 3, the sum of $m+n$ being not greater than 4. These salts are well-known materials and can be prepared by any of the methods commonly known in the art. Preferably the salts employed are salts of diorganosilanols or triorganosilanols.

The amount of catalysts employed is not critical. In general from .01 to 10 percent by weight based on the weight of the siloxane is preferred.

The cyclic siloxanes prepared by the method of this invention are useful as dielectric fluids, mold release agents and as intermediates for the preparation of siloxane elastomers, fluids and resins.

The following examples are illustrative only and should not be construed as limiting the invention which is properly set forth in the appended claims. All percentages are percent by weight based on the total weight of the distillate unless otherwise stated.

*Example 1*

A copolymer was prepared by copolymerizing 2 mols of vinylmethylsiloxane, 2 mols of dimethylsiloxane and .002 mol of diphenylmethylsiloxane by heating a mixture of the siloxanes in the presence of .338 g. of the potassium salt of dimethylsiloxane in amount sufficient to give 1 potassium per 2,000 silicon atoms in the copolymer. Heating was continued until a fluid copolymer was obtained. The temperature was then raised to 155° C. and the pressure lowered to 18 mm. Heating was continued for 1½ hours during which time 94.3% of the siloxane volatilized out of the pot. The residue was fluid. The volatiles were then fractionally distilled to obtain 15.5% monovinylheptamethylcyclotetrasiloxane, 33.4% divinylhexamethylcyclotetrasiloxane and 13.9% trivinylpentamethylcyclotetrasiloxane. There remained in the still pot 26.6% residue which was higher boiling mixed cyclics.

*Example 2*

A copolymer was prepared from 20 mols of methylvinylsiloxane, 20 mols of dimethylsiloxane and .04 mol of diphenylmethylsiloxane by heating the mixture in the presence of 3.4 g. of the catalyst of Example 1. The copolymer was then heated at 160° C. under pressure of 20 mm. and there was obtained 92% by weight volatiles. The residue in the cracking pot was fluid. The volatiles were distilled and there was obtained 19.4% monovinylheptamethylcyclotetrasiloxane, 32.3% divinylhexamethylcyclotetrasiloxane and 36.2% of higher boiling mixed cyclics.

*Example 3*

The residue from the cracking pot of Example 2 was added to a mixture of 20 mols of methylvinylsiloxane and 20 mols of dimethylsiloxane. The fluid residue was soluble in this mixture and the combination was heated for 7 hours at 150° C. in order to copolymerize the mixture. The fluid copolymer was then heated at 145° C. under pressure of 10 mm. whereupon 82.7% by weight of cyclic materials distilled over. This distillate was fractionated and there was obtained 16.2% monovinylheptamethylcyclotetrasiloxane, 36.3% divinylhexamethylcyclotetrasiloxane and 39.2% of higher boiling mixed cyclics.

*Example 4*

Employing the procedure of Example 1, a copolymer of 2 mols of phenylmethylsiloxane, 6 mols of dimethylsiloxane and .016 mol of diphenylmethylsiloxane was prepared. The resulting fluid copolymer was then cracked by heating at a temperature of 250° C. at 2 mm. The distillate obtained from this cracking was distilled to give 7.6% monophenylpentamethylcyclotrisiloxane, 27% monophenylheptamethylcyclotetrasiloxane, 7.1% monophenyl nona-methylcyclopentasiloxane and 12.7% higher boiling mixed cyclics.

*Example 5*

When a copolymer of 99.9 mol percent vinylmethylsiloxane and .1 mol percent phenyldimethylsiloxane is cracked in the presence of .3 g. of sodium hydroxide at a temperature of 145° C. at 10 mm. pressure, cyclic methylvinylsiloxanes are obtained in good yield and the residue in the cracking unit remains fluid throughout the operation.

*Example 6*

When 100 parts by weight of a copolymer of 49 mol percent dimethylsiloxane, 49 mol percent butylmethylsiloxane, 1.5 mol percent triphenylsiloxane and .5 mol percent monomethylsiloxane is cracked in the presence of .5 part by weight of the benzyltrimethylammoniumhydroxide salt of trimethyl silanol, in accordance with the procedure of Example 1, a mixture of monobutylheptamethylcyclotetrasiloxane and dibutylhexamethylcyclotetrasiloxane is obtained.

*Example 7*

When 100 parts by weight of a copolymer of 99 mol percent dimethylsiloxane, .7 mol percent diphenylmethylsiloxane and .3 mol percent monomethylsiloxane is cracked in accordance with the method of Example 1, a high yield of dimethyl cyclic siloxanes is obtained and no gelatin of the residue occurs during cracking.

Equivalent results are obtained when a copolymer of 99 mol percent dimethylsiloxane, .9 mol percent diphenylmethylsiloxane and .1 mol percent $SiO_2$ is employed.

That which is claimed is:

1. The method which comprises heating a fluid siloxane copolymer composed of siloxane units of the formulas $Me_2SiO$, $PhR_2SiO_{.5}$ and $R'_2SiO$, which copolymer may contain a minor amount of siloxane units of the group consisting of $R'SiO_{1.5}$ and $SiO_2$ units, in which siloxane units each R is of the group consisting of phenyl and methyl radicals, each $R'$ is a monovalent hydrocarbon radical of less than 8 carbon atoms and at least one $R'$ per diorganosiloxane unit has more than one carbon atom, in the presence of a small amount of an alkaline catalyst of the group alkali metal hydroxides, quaternary ammonium hydroxides and organosilanol salts of such hydroxides, at a temperature of at least 80° C. under conditions of pressure which will allow volatiles to escape from the reaction zone whereby mixed cyclic diorganosiloxanes are produced.

2. A method in accordance with claim 1 wherein the catalyst is an alkali metal hydroxide.

3. The method in accordance with claim 1 wherein the catalyst is an alkali metal salt of an organosilanol.

References Cited in the file of this patent

UNITED STATES PATENTS

| | | |
|---|---|---|
| 2,455,999 | Hyde | Dec. 14, 1948 |
| 2,552,247 | Wormuth | May 8, 1951 |
| 2,574,265 | Hyde | Nov. 6, 1951 |
| 2,634,284 | Hyde | Apr. 7, 1953 |